US005340941A

United States Patent [19]

Okamoto et al.

[11] Patent Number: 5,340,941

[45] Date of Patent: Aug. 23, 1994

[54] ELECTRONIC MUSICAL INSTRUMENT OF RUBBED STRING SIMULATION TYPE

[75] Inventors: Tetsuo Okamoto; Satoshi Usa, both of Hamamatsu, Japan

[73] Assignee: Yamaha Corporation, Hamamatsu, Japan

[21] Appl. No.: 642,631

[22] Filed: Jan. 17, 1991

[30] Foreign Application Priority Data

Jan. 19, 1990 [JP] Japan .................................. 2-10186

[51] Int. Cl.[5] .......................... G10H 5/00; G01P 3/00

[52] U.S. Cl. ....................................... 84/658; 84/687; 84/690

[58] Field of Search .................... 84/D10, 10, 11, 658, 84/687, 690, 718, 707, 645

[56] References Cited

U.S. PATENT DOCUMENTS

| | | | |
|---|---|---|---|
| 4,776,253 | 10/1988 | Downes | 84/645 |
| 4,909,121 | 3/1990 | Usa et al. . | |
| 4,932,304 | 6/1990 | Franzmann | 84/718 |
| 4,984,276 | 1/1991 | Smith | 84/630 |
| 5,117,730 | 6/1992 | Yamauchi | 84/723 |
| 5,119,709 | 6/1992 | Suzuki et al. | 84/600 |
| 5,125,313 | 6/1992 | Hiyoshi et al. | 84/600 |
| 5,166,466 | 11/1992 | Yamauchi | 84/690 |
| 5,179,242 | 1/1993 | Usa . | |

FOREIGN PATENT DOCUMENTS 63-40199 2/1988 Japan .

*Primary Examiner*—William M. Shoop, Jr.
*Assistant Examiner*—Jeffrey W. Donels
*Attorney, Agent, or Firm*—Graham & James

[57] ABSTRACT

Disclosed is an electronic musical instrument which comprises: manipulator for defining a manipulation region of at least one dimension and for achieving performance manipulation within the manipulation region; position detector for detecting the position of performance manipulation within the manipulation region; arithmetic operation unit for calculating information pertaining to the direction and velocity of movement from the time change of the position of performance manipulation; tone signal generator for generating a tone signal using the information pertaining to the direction and velocity information as a parameter of controlling the tone signal; and latch unit for latching information pertaining to at least one of the direction and velocity of the movement, wherein the tone signal generator generates a tone signal using said information latched by the latch unit when the latch unit is operated. Whereby, information pertaining to the manipulation of the performance manipulator against player's will can be neglected by the player's will and a continuous tone can be generated as desired.

16 Claims, 12 Drawing Sheets

ELECTRONIC MUSICAL INSTRUMENT OF RUBBED STRING SIMULATION TYPE

BACKGROUND OF THE INVENTION a) Field of the Invention

The present invention generally relates to electronic musical instruments, and more particularly to an electronic musical instrument having a performance manipulator capable of generating control variables which change substantially continuously, such as a coordinate variable representing a position on a line or on a plane.

b) Description of the Related Art

Most of electronic musical instruments employ keyboards as main performance manipulators. A keyboard has a plurality of keys so that information of pitch corresponding to each key can be generated when the key is depressed.

Recently, much headway has been made in the development of electronic musical instruments capable of imitatively generating musical tones of a rubbed string instrument, or the like. In a rubbed string instrument, pitch is changed continuously by shifting the position of the finger pressing a string on a fingerboard. Further, the speed of the bow rubbing the string (bow speed) and the pressure of the bow pressing the string (bow pressure) can be changed continuously, so that the musical tone can be changed expressively correspondingly to the amounts of the continuous changes, and the moving direction and turning operation of the bow.

Also in an electronic musical instrument, use of such control variables that can change continuously or other control parameters is effective for changing the musical tone expressively.

Heretofore, performance manipulators such as a keyboard, a guitar controller, a wind controller, etc. have been used as real-time performance manipulators for electronic musical instruments. However, the expression of the musical tone in electronic musical instruments using those performance manipulators is more or less inferior to that in natural musical instruments.

Therefore, there has been made an idea that the speed and pressure equivalent to the bow speed and the bow pressure in a natural rubbed string instrument such as a violin are detected by use of a real-time performance manipulator capable of imitating the image of the rubbed string instrument and are inputted as tone generator control parameters.

The assignee of this application has proposed various manipulators of one dimension (linear manipulators) or two or more dimensions (plane or space manipulators) having a pressure sensor. By actuating the proposed manipulators, it is possible to detect the position and pressure at every sampling time interval to thereby generate information pertaining to the speed and pressure.

SUMMARY OF THE INVENTION

An object of the present invention is to provide an electronic musical instrument adapted for generating a tone signal of a rubbed string instrument or a wind instrument, in which a manipulator having a finite region can be manipulated according to player's will as if it had an infinite region, and permanently continuous tone generation is possible.

According to an aspect of the invention, the electronic musical instrument which comprises: manipulation means for defining a manipulation region of at least one dimension and for achieving performance manipulation within the manipulation region; position detection means for detecting the position of performance manipulation within the manipulation region; arithmetic operation means for calculating information pertaining to the direction and velocity of movement from the time change of the position of performance manipulation; tone signal generating means for generating a tone signal using the information pertaining to the direction and velocity of movement as a parameter of controlling the tone signal; and latch means for latching information pertaining to at least one of the direction and velocity of the movement; wherein said tone signal generating means generates a tone signal using said information latched by said latch means when said latch means is operated.

The information pertaining to the direction and velocity of movement can be derived from the time change of the position of performance manipulation on the basis of the manipulation of the performance manipulation means. Further, the turning of the direction of movement or the change of the velocity of movement can be neglected through the switching means. Accordingly, the turning of the direction and the change of the velocity of movement which are unintended have no influence on parameters for generating a tone.

Figure 1:
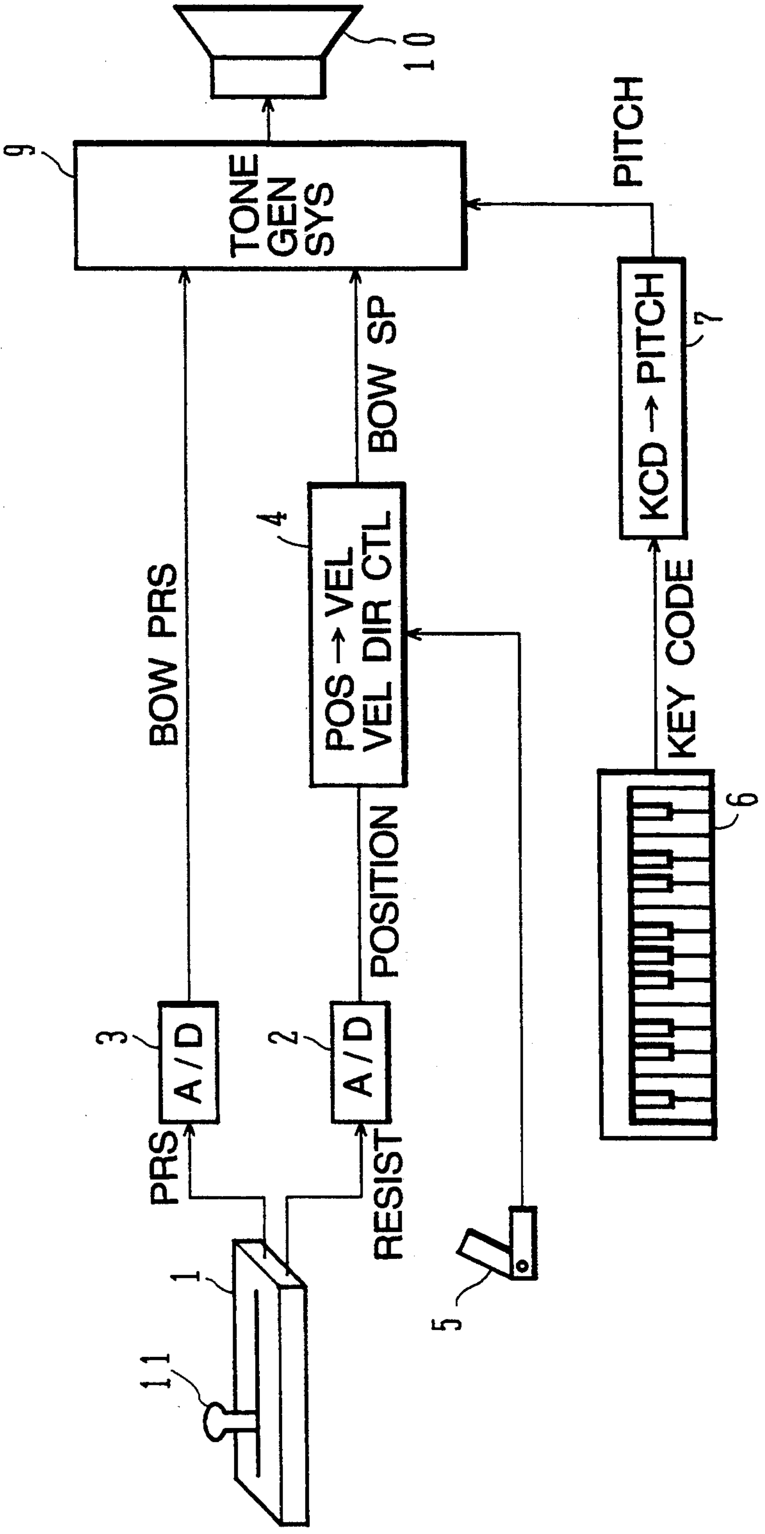
FIG. 1 is a block diagram showing an electronic musical instrument according to an embodiment of the present invention.

In the drawing, the reference numerals designate as follows: 1 . . . pressure-sensitive type performance manipulator; 2, 3 . . . analog-to digital converter; 4 . . . position-velocity converting and velocity direction controlling circuit; 5 . . . foot pedal switch; 6 . . . keyboard; 7 . . . key-code to pitch converter circuit; 9 . . . tone generation system; 10 . . . sound system; 14 . . . timer; 17 . . . CPU; 18 . . . ROM; 19 . . . RAM; 20 . . . tone generation system; 21 . . . velocity buffer; 22 . . . pressure buffer; 23 . . . direction buffer; 26 . . . key buffer; 27 . .

. delay stage varying table; 28, 29 . . . multiplication circuit; 31, 32 . . . coefficient circuit; 34 . . . tone generation circuit; 35 . . . sound system; 37 . . . event buffer; 41, 42, 43 . . . addition circuit; 44 . . . division circuit; 45 . . . non-linear circuit; 45*a*, 45*b* . . . non-linear table; 45*c* . . . selector; 46 . . . multiplication circuit; 48 . . . low-pass filter; 49 . . . multiplication circuit; 51 . . . closed loop; 52, 53 . . . delay circuit; 54, 55 . . . low-pass filter; 58, 59 . . . decay control circuit; 62, 63 . . . multiplication circuit; 64, 65 . . . addition circuit; 71 . . . pressure-sensitive slide type performance manipulator; 73 . . . knob; 75 . . . slide resistor; 77 . . . pressure sensor; 79 . . . casing; 81 . . . pressure-sensitive flat board type performance manipulator; 83 . . . hand performance manipulator; and 85 . . . manipulation region.

DESCRIPTION OF THE PREFERRED EMBODIMENTS

First, the previous proposal of the present Assignee, pertaining to an electronic musical instrument suitable for generating a tone of a rubbed string instrument, will be described hereinbelow.

Figure 4:
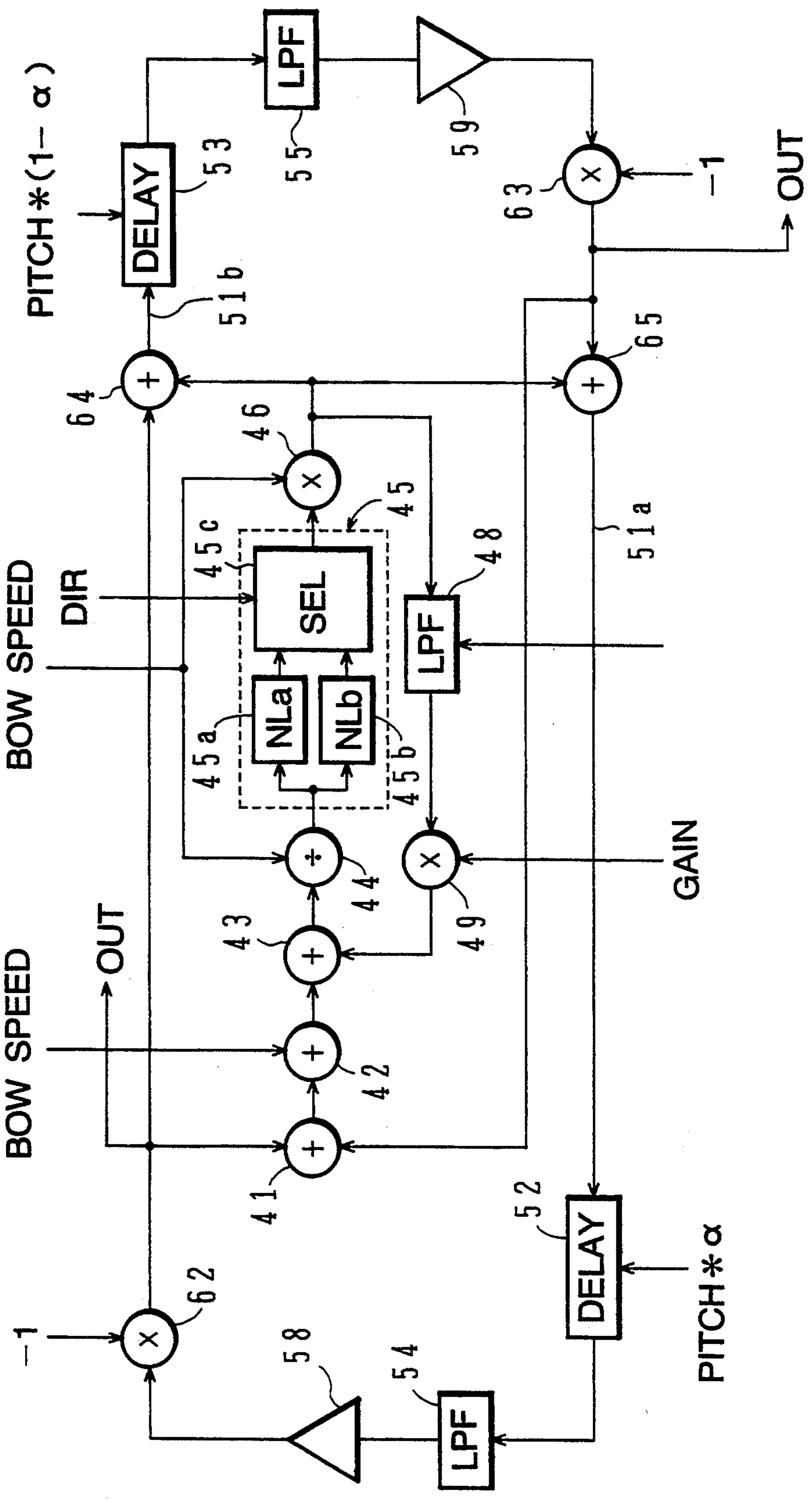
FIG. 4 is a tone generating circuit adapted for generating the musical tones of a rubbed string instrument.

FIG. 4 shows a tone generator model adapted for simulating a rubbed string instrument. Corresponding to the rubbing action of a bow on a string of a rubbed string instrument, a bow speed signal is generated and fed into an addition circuit 42. This bow speed signal is a starting signal and supplied to a non-linear circuit 45 through an addition circuit 43 and a division circuit 44. The non-linear circuit 45 is a circuit for representing the non-linear characteristic of a string of the violin. The non-linear circuit 45 includes a first non-linear circuit NLa 45*a* which represents the characteristic when the bow is moving downward, a second non-linear circuit NLb 45*b* which represents the characteristic when the bow is moving upward, and a selector circuit 45*c* for selecting one of the respective output signals of the two non-linear circuits. The selector circuit 45*c* is controlled by the direction signal.

The non-linear characteristics of the non-linear circuits 45*a* and 45*b* include a substantially linear region from the origin to certain points, and outer regions of changed characteristic. When the string of a rubbed string instrument such as violin is rubbed by the bow, as long as the bow speed is slow, the displacement of the string is almost equivalent to the displacement of the bow so that the movement of the string can be represented in the term of the static friction coefficient. When the speed of the bow relative to the string exceeds a certain value, the speed of the bow and the displacement speed of the string are no longer the same. Namely, the movement is dominated by the dynamic friction coefficient, in place of the static friction coefficient. This changeover from the static friction coefficient to the dynamic friction coefficient is done rapidly.

In FIG. 4, the output of the non-linear circuit 45 is supplied to two addition circuits 64 and 65 through a multiplication circuit 46.

The division circuit 44 on the input side and the multiplication circuit 46 on the output side of the non-linear circuit 45 receive the bow pressure signal and modify the characteristic of the non-linear circuit 45. The division circuit 44 on the input side changes the input signal to a smaller value by dividing it. Namely, when the division circuit 44 is connected, even when a large input is applied, an output as if the input was small is generated. The multiplication circuit 46 on the output side plays the role of increasing the output of the non-linear circuit 45. Here, upon the same bow pressure signal, first dividing the input and finally multiplying the output means dividing a characteristic by a coefficient C in the division circuit 44 and multiplying the result by the same coefficient $C_0$ in the multiplication circuit 46. In this case, the characteristic 53 of the non-linear circuit 45 has a shape which is multiplied by $C_0$ both in the abscissa and in the ordinate. It is also possible to differentiate the coefficient of the multiplication circuit from the coefficient of the division circuit, to form a different shape.

The addition circuits 64 and 65 are provided in circulating signal paths 51*a* and 51*b*. The circulating path 51 forms a closed loop for circulating the tone signal corresponding to the string of the rubbed string instrument. Namely, in the case of a string, the vibration is reflected at the opposite ends of the string and moves back and forth. This behavior is approximated by the closed loop in which a signal circulates. The circulating signal path includes two delay circuits 52 and 53, two low-pass filters (LPF) 54 and 55, two decay control circuits 58 and 59, and two multiplication circuits 62 and 63. Each of the delay circuits 52 and 53 receives the product of the pitch signal representing the tone pitch and the coefficient $\alpha$ or $(1-\alpha)$ and gives a predetermined delay time. The total delay time required for returning a signal to its original position by circulation in the circulating signal paths 51*a* and 51*b* determines the basic tone pitch. Namely, the sum of the delay times of the two delay circuits 52 and 53, $\text{pitch}\times[\alpha+(1-\alpha)]=\text{pitch}$, determines the basic pitch. One delay circuit corresponds to the distance from the position where the bow touches the string to the bridge, and the other delay circuit corresponds to the distance from the position where the bow touches the string to the depressed finger position.

Although the pitch is mainly determined by the delay circuits 52 and 53, other factors included in the circulating signal path such as LPFs 54 and 55, decay controls 58 and 59, etc. also can produce delays. Strictly, the pitch of the tone to be generated is determined by the sum of all delay times included in the loop.

The LPFs 54 and 55 simulate the vibration characteristics of various strings by altering the transmission characteristics of the circulating waveform signal. A tone color signal is generated by selecting a tone color pad on the keyboard panel, or the like, and supplied to the LPFs 54 and 55 to change over the characteristic to simulate the tone of a desired rubbed string instrument.

While the vibration propagates on the string, the vibration decays gradually. The decay controls 58 and 59 simulate the quantity of the decay of the vibration propagating on the string.

The multiplication circuits 62 and 63 multiply the input signal by the reflection coefficient $-1$ in correspondence to the reflection of the vibration at fixed ends of the string. Namely, assuming the reflection at the fixed ends without decay, the amplitude of the string is changed to the opposite phase. The coefficient $-1$ represents this opposite phase reflection. The decay of the amplitude caused by the reflection is incorporated in the quantity of decay in the decay controls 58 and 59.

In this way, the motion of the string of the rubbed string instrument is simulated by the vibration signal circulating on the circulating signal paths 51*a* and 51*b* which correspond to the string.

Further, the motion of the string of the rubbed string instrument has hysteresis characteristic. For simulating this hysteresis characteristic, the output of the multiplication circuit 46 is fed back to the input of the non-linear circuit 45 through the LPF 48 and the multiplication circuit 49. The LPF 48 serves to prevent oscillation in the feedback loop.

Letting the input from the addition circuit 42 to the addition circuit 43 be u, the input from the feedback path to the addition circuit 43 be v, and the amplification factor of the division circuit 44, the non-linear circuit 45 and the multiplication circuit 46 in total be A, then the output w of the multiplication circuit 46 can be represented by (u+v)A=w. letting the gain of the negative feedback loop including the LPF 48 and the multiplication circuit 49 be B, then the amount of feedback v can be represented by v=wB. Arranging these two equations, $$(u+wB)\,A=w$$

therefore, $$w=uA/(1-AB)$$

In the case of no feedback, i.e. B=0, the output w can be simply represented by w=uA, which represents that the input u is simply multiplied by a factor A and then sent out. In the case of negative feedback of a gain B, an input (1−AB) times (B is negative) as large as the input in the ease of B=0 should be applied to obtain an output of the same magnitude.

The characteristic when the input is increasing and there is such feedback is as follows. When the input increases to a certain value $Th_1$, there occurs changeover from the static friction coefficient to the dynamic friction coefficient, so that the output decreases stepwise.

When the input has once exceeded the threshold value $Th_1$ and then decreases to a smaller value again, the output w is small and hence the feedback amount v=Bw is also small. Namely, even if the magnitude of the signal inputted into the non-linear circuit 45 is the same, the negative feedback amount is relatively small in the case of the dynamic friction coefficient region, compared with the ease of the static friction coefficient region, so that the input u from the addition circuit 42 to the addition circuit 43 takes a smaller value.

Consider now the magnitude of the input u from the addition circuit 42 when the input to the non-linear circuit 45 becomes the threshold value. When the input is increasing, the static friction coefficient dominates the motion. Accordingly, a strong negative feedback is applied corresponding to a large output, so that the changeover occurs at a larger input $Th_1$. On the contrary, when the input is decreasing, the dynamic friction coefficient dominates the motion. Accordingly, the negative feedback is small corresponding to a small output, so that the changeover occurs at a smaller input u than $Th_1$. Therefore, the relation between the input u and the output w when the input is gradually increasing and when the input is gradually decreasing can be obtained as a hysteresis characteristic. The magnitude of hysteresis is controlled by the gain of the multiplication circuit 49.

In this way, according to the tone signal generating circuit as shown in FIG. 4, the motion of the string of the rubbed string instrument can be simulated, so that a basic tone waveform can be produced.

An output is derived from some point in the circulating signal paths 51*a* and 51*b* as shown in FIG. 4 and is supplied to the sound system through the formant filter (etc.) which simulates the characteristic of the belly of the rubbed string instrument. The formant filter may be arranged to vary its characteristic upon reception of a tone color signal.

In the tone signal generating circuit shown in FIG. 4, the signal having motive power for generating the tone is given by the bow speed. Further, the pressure signal is used as a signal For controlling the characteristic of the non-linear circuit 45. Further, the characteristic of the non-linear circuit 45 per se is controlled by the direction of tile movement of the bow. That is, the bow speed, the bow pressure and the direction are used as basic parameters for simulating the tone of the rubbed string instrument. It is preferable that these parameters are controllable based on the player's will or the performance manipulation of the player. Although a parameter for designating the pitch can be derived by the operation of the the keyboard, the parameters such as the bow speed, the bow pressure and the direction cannot be derived from the keyboard.

Therefore, manipulators other than the keyboard are used for deriving the parameters such as the bow speed, the bow pressure and the direction.

A tone generator model adapted for simulating the tone mechanism of a wind instrument has been disclosed in Japanese Patent Application Laid-Open No. Sho-63-40199, which is herein incorporated by reference, etc. According to the model, the tone is generated on the basis of information pertaining to wind pressure, information pertaining to embouchure and information pertaining to pitch. In the case of such a tone generator model adapted for simulating the tone mechanism of a wind instrument, performance manipulators other than the keyboard are desired.

Figure 5:
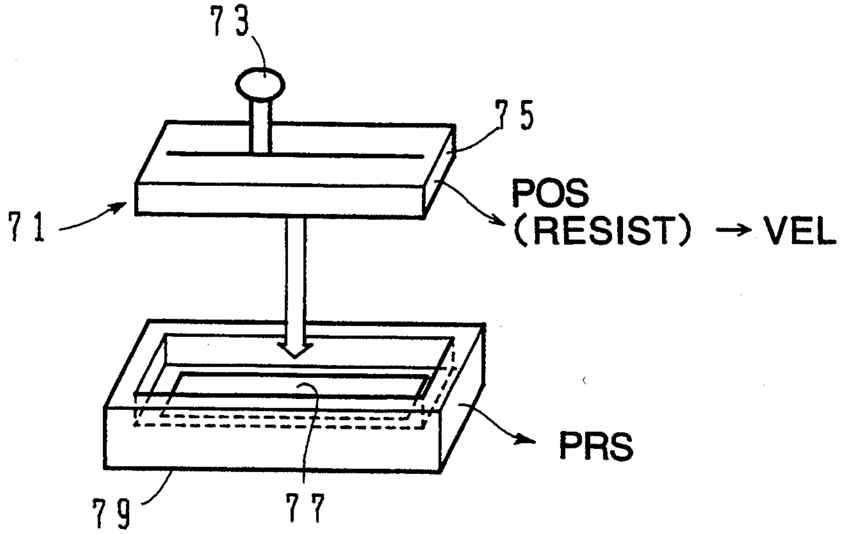
FIG. 5 is a perspective view showing a pressure-sensitive slide-type performance manipulator.

FIG. 5 is a schematic perspective view showing an example of the configuration of a pressure-sensitive slide-type performance manipulator capable of generating these parameters.

The pressure-sensitive slide-type performance manipulator 71 has a knob 73 which is continued to a slide resistor sliding terminal at the lower portion of the knob 73. A resistance value corresponding to the position of the knob 73 is detected from a slide resistor 75. The slide resistor 75 including the knob 73 is disposed on a pressure sensor 77, so that the pressure sensor generates a pressure signal corresponding to the force with which the knob 73 is pressed down. Here, the pressure sensor 77 is put in a casing 79.

Each of the position signal and the pressure signal is generated in the form of a voltage signal. For example, a predetermined voltage is applied between opposite ends of the slide resistor so that a voltage corresponding to the position of the knob 73 is taken out from the sliding terminal.

Bow pressure information or embouchure information can be derived from the pressure signal. Also, bow speed information or wind pressure information can be derived from the change (the difference between sample points) of the position signal.

Figure 6:
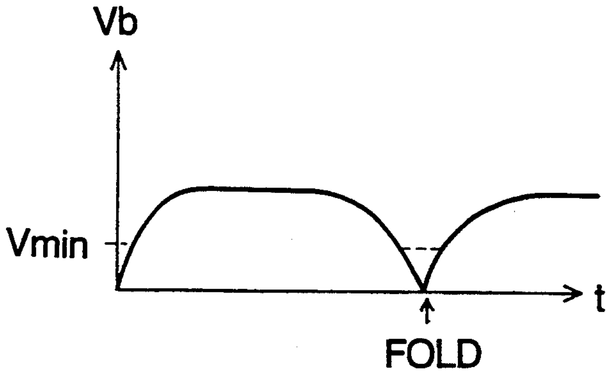
FIG. 6 is a graph showing the characteristic of a bow velocity signal given by the return of a bow.

When the knob 73 is moved in one direction using the performance manipulator 71 as shown in FIG. 5, the knob 73 strikes an end. Accordingly, the direction of movement must be reversed. The change of manipulation speed at this time is as shown in FIG. 6. Although an attempt to operate the knob at a constant speed may be made, the speed becomes slow when the knob approaches the end portion. Namely, the motion of the knob is once stopped at the end portion and then started reversely to obtain a desired speed.

As represented by the non-linear circuits 45*a* and 45*b* in FIG. 4, the tone varies according to the direction of movement of the manipulator. Because the manipulation speed once becomes zero at the time of turning, the tone is interrupted. In the case of a slide resistor having a finite length, it is difficult or impossible to generate one tone continuously. There arises a problem in that an unintended operation such as a turning operation or a speed reducing operation is unavoidable. Also in the case where a performance manipulator having a manipulation region of at least two dimensions is used, the same problem arises because the manipulation region is finite.

An example of the configuration of the electronic musical instrument according to an embodiment of the present invention is shown in FIG. 1. A resistance value output pertaining to position and an output pertaining to pressure are generated by a pressure-sensitive slide-type performance manipulator 1 having a knob 11 and are respectively supplied to analog-to-digital (A/D) converters 2 and 3. The digital position signal from the A/D converter 2 is supplied to a position-velocity converting and velocity direction controlling circuit 4 and is converted into velocity information. The velocity information to be treated as bow speed information is supplied to a tone generator 9. A foot pedal switch 5 is connected to the position-velocity converting and velocity direction controlling circuit 4, so that a signal for judging whether the turning movement of the knob of the pressure-sensitive slide-type performance manipulator 1 is to be taken out as a signal or whether the turning movement is to be neglected is inputted. Further, the digital pressure signal as bow pressure information is supplied to the tone generator 9 from the A/D converter 3. On the other hand, key code information corresponding to the tone pitch assigned to a depressed key is generated from the keyboard 6 and is converted into a pitch signal by a key code-pitch converter circuit 7. The pitch signal is supplied to the tone generation system 9. The tone generation system 9 generates a tone generating signal on the basis of the bow speed information, the direction information, the bow pressure information and the tone pitch information.

Figure 2:
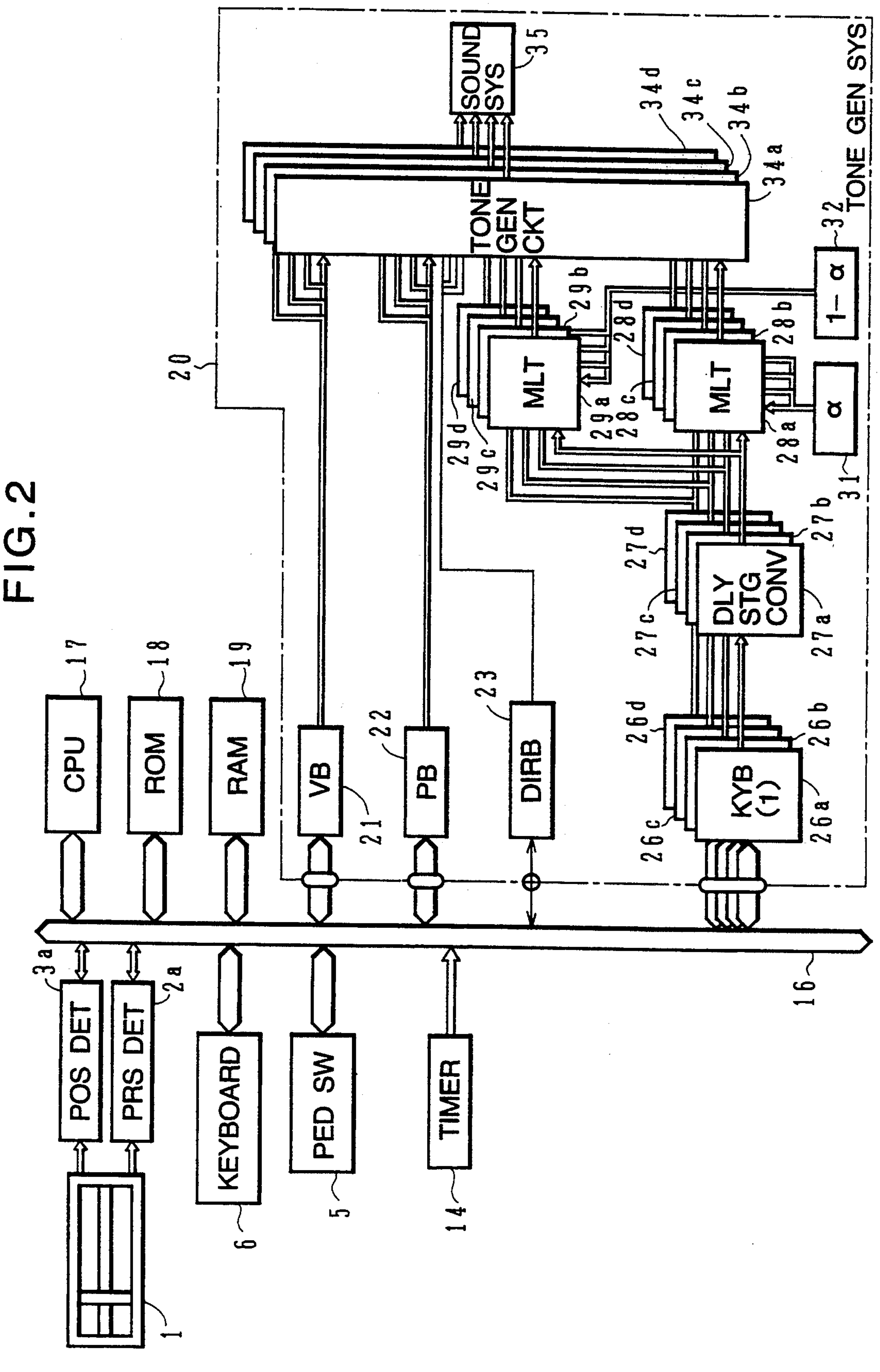
FIG. 2 is a block diagram showing an example of a hardware structure of the electronic musical instrument depicted in FIG. 1.

For example, the electronic musical instrument according to the embodiment depicted in FIG. 1 can be realized by the hardware structure as shown in FIG. 2. Similar to the structure as shown in FIG. 5, the pressure-sensitive slide-type performance manipulator 1 is constituted by a slide resistor having a pressure sensor. The manipulation position and manipulation pressure of the manipulator are detected by a position detector 3*a* and a pressure detector 2*a* and are supplied to a data bus 16. The position information once detected can form parameters such as velocity information, distance information, direction information, etc. by arithmetic operations. A keyboard 6 includes a large number of keys for designating pitch, a tone color pad for designating tone color as related to the kinds of instrument, and manipulators used for other functions. These informations are supplied to the bus. A timer 14 serves to supply timer interrupt timing information to the bus 16.

The pedal switch 5 is a switch for selecting whether the change of the sign in velocity information is used as a tone generating parameter or not.

Further, a CPU 17 for performing predetermined processing treatment, an ROM 18 for storing the program to be executed in the CPU, etc., an RAM 19 including various kinds of registers and work memories, etc. for storing various kinds of temporary information to be used for executing the program, and a tone generation system 20 are connected to the bus 16.

Here, the ROM 18 stores a program for generating the tone, and the CPU 17 performs the tone synthesizing processing utilizing the registers in the RAM 19, etc.

The tone signal generation system 20 includes a velocity buffer VB 21 for receiving the velocity information from the bus 16, a pressure buffer PB 22 for receiving the pressure information from the bus 16, a direction buffer DIRB 23 for receiving the direction information from the bus 16, and other buffers for receiving other information such as performance style, tone color, etc. from the bus 16. The velocity information, the pressure information, the direction information and other information are supplied to the tone generation circuits 34*a*, 34*b*, 34*c* and 34*d*. Although a structure is shown in which a plurality of tone generation circuits are provided, one tone generation circuit can do similar functions when time sharing control is employed The tone pitch information given by manipulating a key in the keyboard 6 is stored in key buffers KYB 26*a*, 26*b*, 26*c* and 26*d*. Here, four key buffers are provided in correspondence to the four strings of a rubbed string instrument such as a violin and a viola. The key data stored in the key buffers KYB 26*a* to 26*d* includes the most significant bit MSB representing the on/off of the key and remaining bits of the pitch data representing the pitch. The pitch data are sent to the corresponding delay stage varying or converting circuits 27*a* to 27*d* and supplied to the tone generators 34*a* to 34*d*through multiplication circuits 28*a* to 28*d* and 29*a* to 29*d*. The delay stage varying circuits 27*a* to 27*d* decrease the number of stages of delay when pitch is low, so that the number (frequency) of circulations of a tone signal in the closed-loop circuit, as shown in FIG. 4, in the tone generator in a predetermined time is changed. In the multiplication circuits 28*a* to 28*d*, the input pitch is multiplied by a coefficient $\alpha$. In the multiplication circuits 29*a* to 29*d*, the input pitch is multiplied by another coefficient $(1-\alpha)$. These two multiplications represent that a string of a rubbed string instrument from the bridge (which serves as a fixed end) to the depressed finger position on the fingerboard may be divided into two portions at the position where the bow rubs the string. In short, the fact that the addition of the two coefficients makes 1 represents the basic length from the depressed finger position to the bridge which determines the pitch. When one coefficient $\alpha$ corresponds to the distance from the string rubbing position to the bridge, the other coefficient $(1-\alpha)$ corresponds to the distance from the string rubbing position to the depressed finger position. In this way, the information representing the pitch is supplied to the tone generation circuits 34*a* to 34*d*. The velocity buffer 21 is a register for temporarily storing the velocity information derived from the velocity of the moving knob of the slide-type manipulator 1. The pressure buffer 22 is a register for temporarily storing the pressure information derived from the pressure when the knob of the slide-type manipulator 1 is depressed. The direction buffer DIRB 23 temporarily stores the direction information obtained from the change of the manipulation position.

Tone signals are generated by the tone generators 34*a* to 34*d* on the basis of the velocity information, the pressure information, the direction information, etc. and supplied to the sound system 35 to generate the tone. Here, each of the tone generation circuit 34*a* to 34*d* includes a formant filter for simulating the behavior of the belly of the rubbed string instrument. The sound system 35 includes means for converting the digital tone signal into an analog signal, means for amplifying the analog signal and means for transforming the amplified electric signal into an acoustic signal.

In this way, tones of a rubbed string instrument which can be changed expressively in a variety of ways correspondingly to the bow velocity, the bow pressure and the bow moving direction can be generated.

Now, among the registers included in the RAM, major ones will be explained hereinbelow.

Pedal Switch Flag Register (PEDSW)

This is a register for storing a flag indicating whether the bow moving direction switching information is used as a tone signal generating parameter or not. This flag is changed over by the pedal switch 5.

Previous Pedal Switch Flag Register (PPEDSW)

This is a register for storing the pedal switch flag at the previous time.

Event Buffer Register (EVTBUF)

Figure 3:
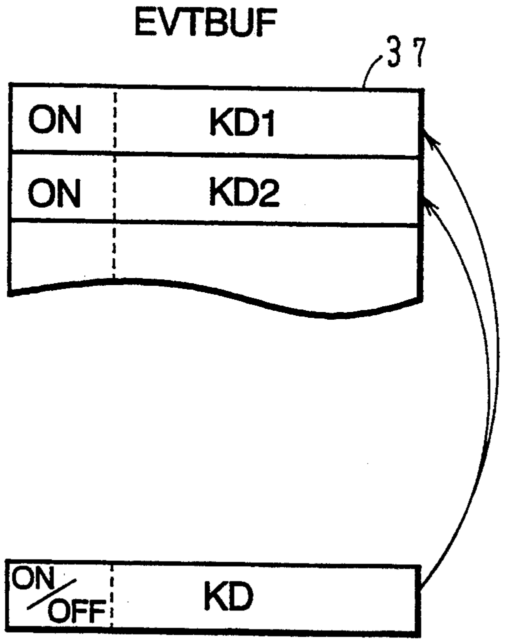
FIG. 3 is a conceptual view showing an example of the configuration of an event buffer as a buffer group.

This is a register for storing key event data corresponding to key depression and key release of keys in the keyboard. As shown in FIG. 3, this register has a capacity for storing key event data, each including an on/off data and key data representing the tone pitch. In the case of a rubbed string instrument, four event buffer registers are provided to enable four key event data to be stored, considering the case where four strings are performed simultaneously. These registers play the role of storing the tone pitch data temporarily.

X Position Register (X)

This is a register for storing the present manipulation position X of the knob of the pressure-sensitive slide-type performance manipulator.

Previous X Position Register (Xp)

This is a register for storing the X directional position of the pressure-sensitive slide-type performance manipulator at the time of previous timer interrupt.

Velocity Register (Vb)

This is an RAM-side register for storing the velocity representing the bow velocity. In the case where a linear (one-dimensional) manipulator is used, the velocity information is derived from the distance of movement calculated from the change of the X directional position (by dividing the distance by time). In the case where a plane (two-dimensional) manipulator is used, the velocity information represents the velocity in a plane.

Speed Register (ABS(Vb))

This is a register for storing the absolute value $|Vb|$ of the velocity (Vb).

Pressure Register (P)

This is an RAM-side register for storing the pressure data derived from the output P0 of the pressure sensor provided in the performance manipulator 1.

Fine Pressure Register (P1)

This is a register for storing a fixed value for a predetermined pressure near zero.

Direction Register (DIR)

This is a register for storing a flag representing the direction of movement of the knob (bow) of the pressure-sensitive slide-type performance manipulator.

Separately, a velocity buffer VB, a pressure buffer PB, a direction buffer DIRB, etc. are provided in the tone signal generating circuit 8.

Direction Latch Register (DIRL)

This is a register for latching the value of the direction flag DIR at latch timing.

Flag OLD Register (OLD)

This is a register for storing "1" or "0" representing that the flag OLD is set or reset. If this flag is "1", it means that the phenomenon represented by this flag has been already detected and this is the timer interrupt on the the second or on time.

Y Position Register (Y)

This is a register for storing the Y directional position of the performance manipulator in the case where a plane (two-dimensional) manipulator is used.

Previous Y Position Register (Yp)

This is a register for storing the Y directional position of the performance manipulator at the time of previous timer interrupt.

Angle Register ($\theta$)

This is a register for storing the angle from the line connecting the center coordinates (Xc, Yc) and the present position of performance manipulation to the line connecting the center coordinates (Xc, Yc) and the previous position of performance manipulation.

Previous Angle Register ($\theta$p)

This is a register for storing the angle data at the time of previous timer interrupt.

Direction Register (dir)

This is a register for storing the angle change $\theta-\theta$ p.

Also, other registers for storing various constants and variables are provided, but the description thereof is omitted here.

In the following, a flow chart of tone generation in the case of performing a rubbed string instrument by utilizing a structure as described above will be described. It is now assumed that the pedal switch 5 is constituted by a switch which takes the on/off state selectively.

Figure 7:
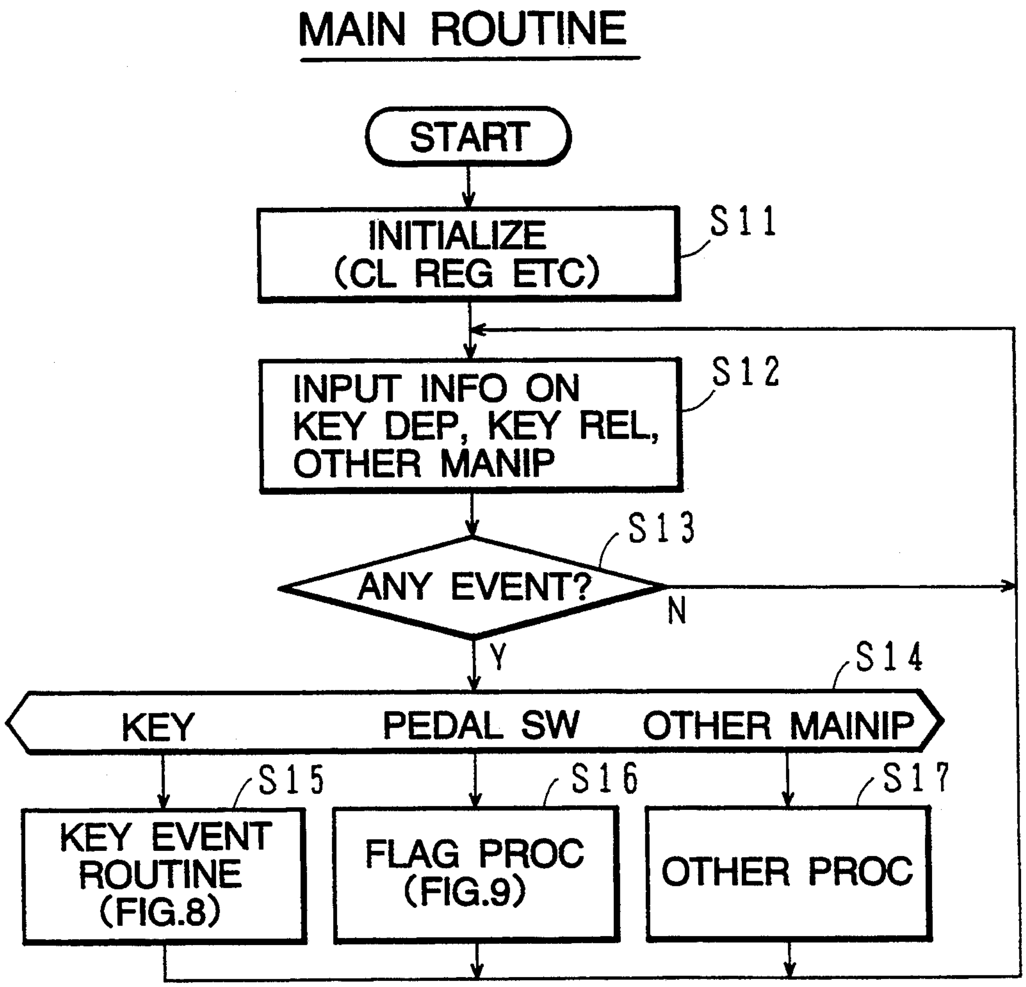
FIG. 7 is a flow chart of the main routine.

First, the main routine is shown in FIG. 7. When the main routine is started, initialization is done in the step S11. For example, the respective registers are cleared. In the next step S12, the information of key depression and key release in the keyboard and the information on the manipulation of the respective manipulators such as plane manipulator, etc. are detected and inputted.

When the performance manipulation information is inputted, a judgment is made as to whether an event or events have occurred or not, in the step S13.

If there is an event, the flow goes to the step S14. In the step S14, judgments are made as to whether there is a key event or not, whether the pedal switch is operated or not, and whether other manipulators are manipulated or not. If there is a key event, the flow goes to the key event routine of the step S15. When the pedal switch is operated, the flag processing of the step S16 is done. Also, when any one of the other manipulators is manipulated, the corresponding processing is done in the step S17.

Figure 8:
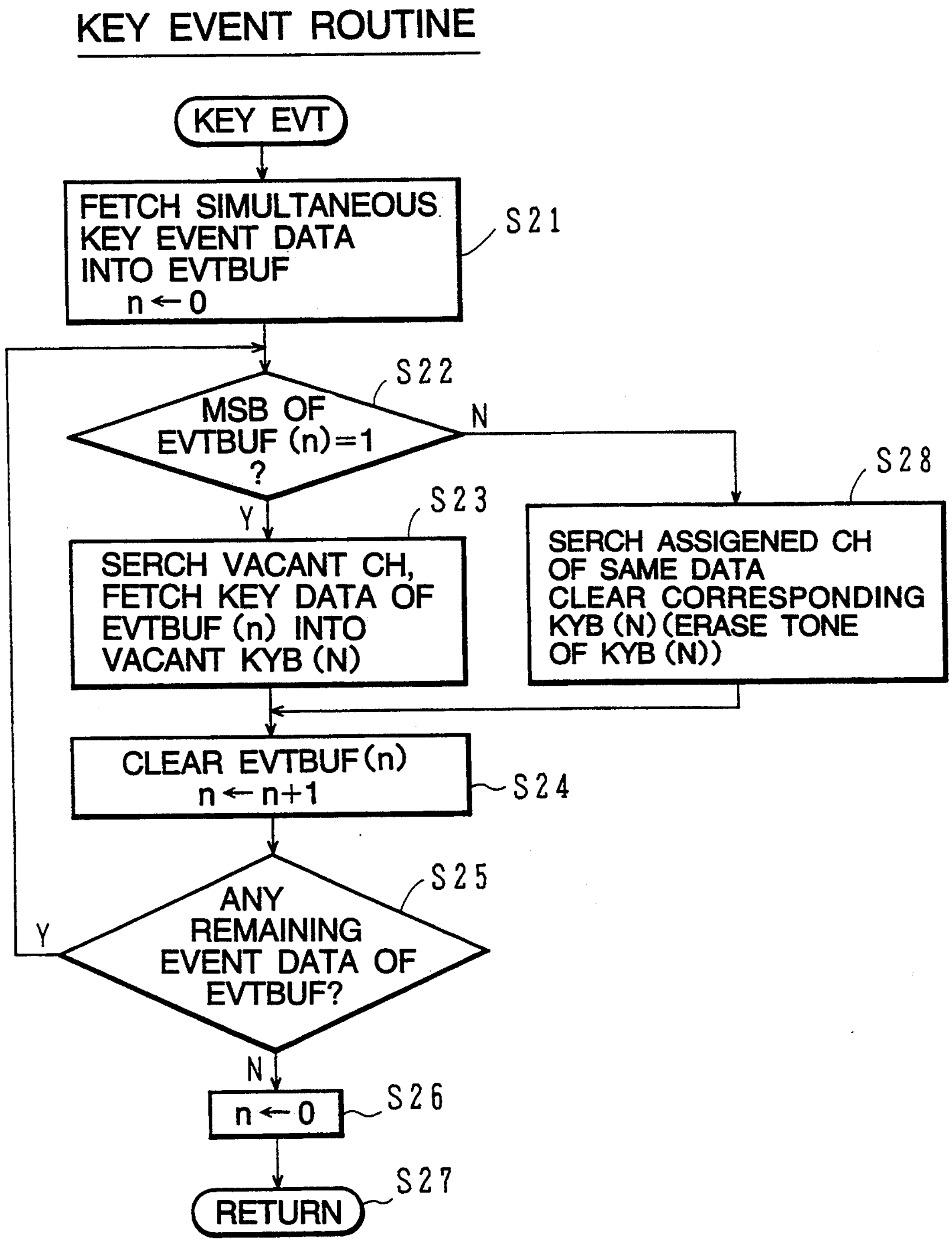
FIG. 8 is a flow chart of the key event routine.

FIG. 8 shows the key event routine. When the key event routine is started, in the step S21, data of key events which have occurred simultaneously are fetched into event buffer registers EVTBUF and "0" is set in the number n.

In the next step S22, a judgment is made as to whether the MSB of the n-th (first 0-th) event buffer register EVTBUF(n) is "1" or not. The fact that the MSB is "1" indicates a depressed key state in which a key is depressed. The fact that the MSB is "0" indicates a released key state. If MSB is "1", the flow goes to the next step S23 along the arrow Y.

In the step S23, the key data of the event buffer register EVTBUF(n) is fetched into a vacant key buffer KYB(N) after searching vacant channels for inputting the depressed key data.

Then, the event buffer register EVTBUF(n) which has fetched the key data is cleared. Then, the number n is counted up by one to n+1 (the step S24).

In the next step S25, judgment is made as to whether there are remaining event data in the event buffer registers or not. If there is no remaining data, "0" is set in the number n to terminate the processing (the step S26), and the flow returns (the step S27).

When there is any remaining event in the event buffer registers, the flow goes back from the step S25 to the step S22.

In the step S22, if MSB of the n-th event buffer register is "0", the flow goes to the step S28 and an assigned channel of the same key data is searched for. Namely, MSB="0" means key release. For realizing key release, the key should be depressed beforehand. Therefore, a key buffer storing the depressed key data is searched for. When the assigned channel is searched out, the associated key buffer KYB(N) corresponding to the key release is cleared and the corresponding tone is erased.

In this embodiment, for generating a tone, it is necessary that any one key in the keyboard is depressed and the hand manipulator presses the receiver in the manipulator. In an electronic musical instrument which requires two conditions of key depression and manipulation of the hand manipulator as the tone generating conditions, the tone is erased when the key is released. Clearing of KYB corresponds to the key release.

Here, the processing corresponding to key release is not always required. For example, an assignment system in which the oldest assigned key data is successively rewritten may be employed. Further, tone generation or tone erasing may depend on only the pressure-sensitive slide-type performance manipulator.

Figure 9:
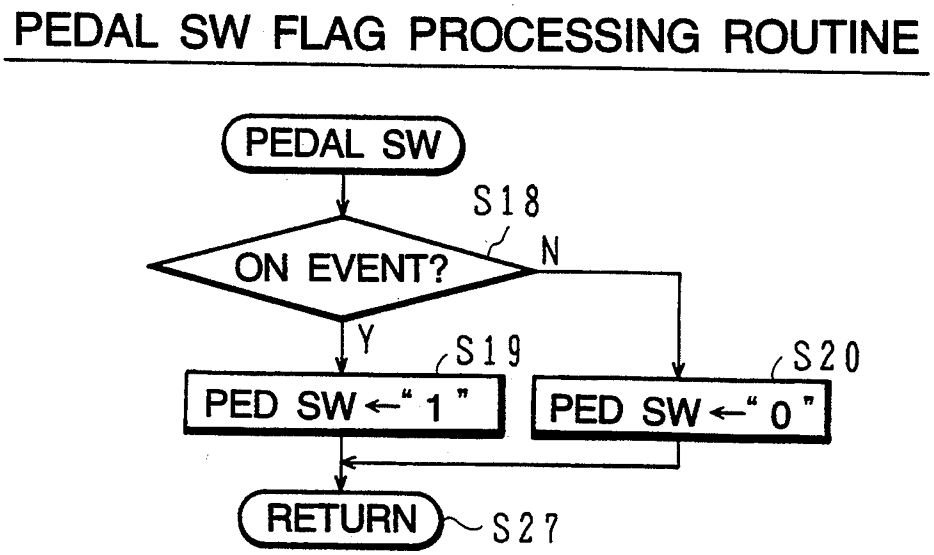
FIG. 9 is a flow chart of the pedal switch flag routine.

FIG. 9 shows the pedal switch processing routine. When the pedal switch is operated, judgment is made as to whether it is an on-event or not, in step S18. If it is an on-event, "1" is set in the register PEDSW in the step S19. If it is not an on-event, "0" is set in the register PEDSW in the step S20. Then, the flow returns (the step S27).

Figure 10:
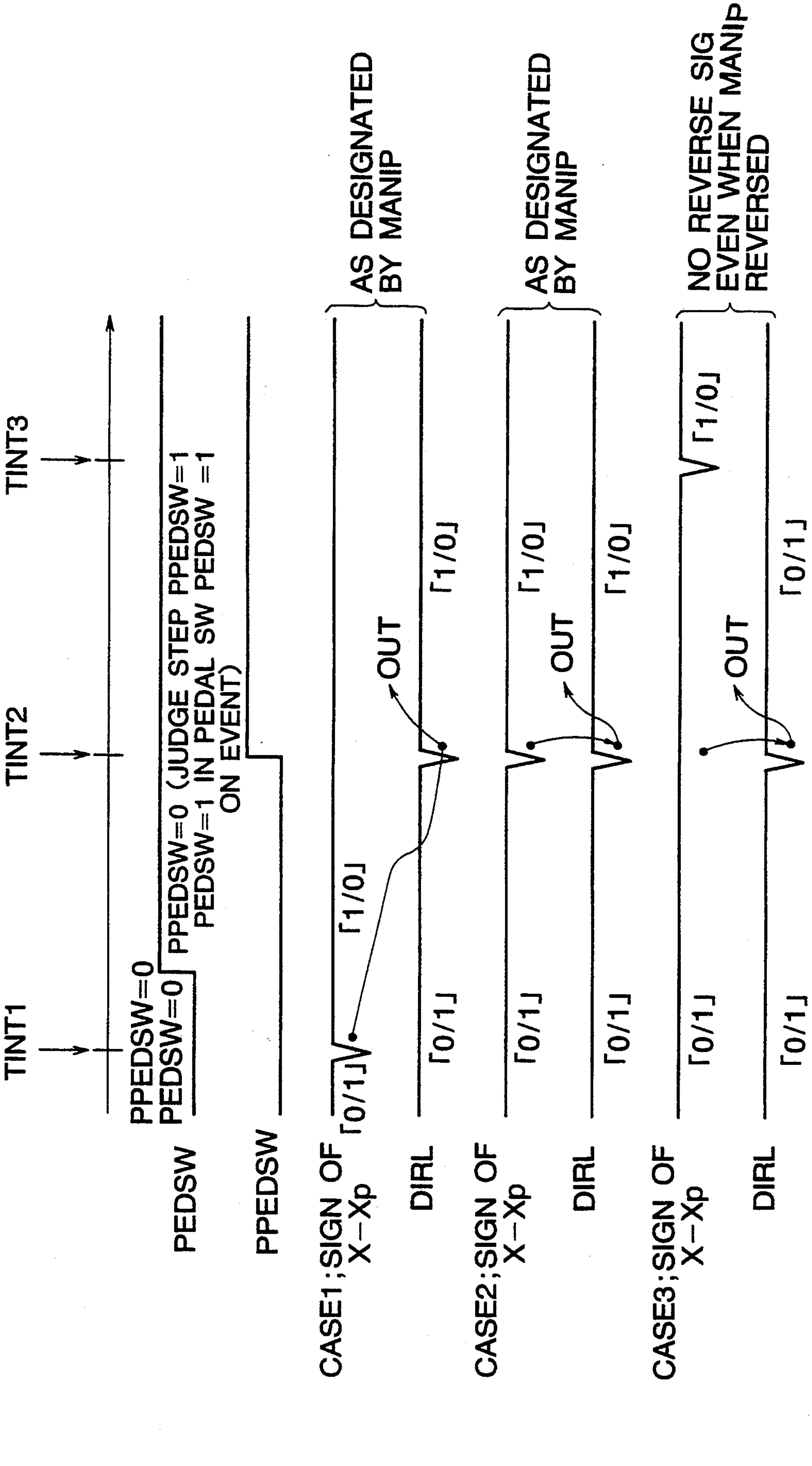
FIG. 10 is a graph showing the form of performance given by the operation of a pedal switch.

The outline of the tone generating operation based on the states PPEDSW and PEDSW of the pedal switch will be described with reference to the waveform of FIG. 10.

It is assumed that timer interrupts TINT1, TINT2 and TINT3 occur successively, based on the timer, on a time axis t and the foot pedal is operated after TINT1.

When the pedal is operated, the pedal switch flag PEDSW turns to "1". Namely, the present pedal switch flag PEDSW has changed from "0" to "1" at TINT2. That is, the previous pedal switch flag PPEDSW and the pedal switch flag PEDSW are both "0" at the time of the first timer interrupt (TINT1). At the time of the second timer interrupt (TINT2), the previous pedal switch flag PPEDSW is "0", and the present pedal switch flag PEDSW is "1". At the time of the third timer interrupt (TINT3), the previous pedal switch flag PPEDSW and the present pedal switch flag PEDSW are both "1".

Under the aforementioned condition, in case 1, it is assumed that the turning of the direction of movement of the bow is detected at the time of the first timer interrupt. In this case, the pedal switch is not yet operated at the time of the first timer interrupt. Accordingly, the flag PEDSW is "0", so that tone signal generation is made according to the bow moving direction turning operation. The direction latch DIRL is not operated at the time of TINT1. At the time of the next timer interrupt TINT2 after the operation of the pedal switch, the direction latch DIRL latches the sign "1/0" of X−Xp corresponding to the operation of the pedal switch. Because the sign of X−Xp does not change after that, there is no influence on the tone signal generation.

As a result, the tone signal generation in the tone signal generating circuit is done according to the operation of the manipulator.

In case 2, it is assumed that the turning of the direction is detected at the time of the second interrupt. At the time of the second timer interrupt, the previous pedal switch flag PPEDSW is "0", and the present pedal switch flag PEDSW is "1". Accordingly, the direction latch DIRL latches the direction "1/0" after the turning of the direction of movement of the bow. Because the turning of the direction of movement of the bow does not occur thereafter, the tone signal generation is done according to the operation of the manipulator.

In both the cases 1 and 2, no reversal signal will be generated thereafter even if the manipulator is reversed, unless the pedal switch is turned off.

In case 3, the turning of the direction of movement of the bow occurs at the time of the third timer interrupt TINT3. In this case, the direction latch. DIR has latched the direction of movement of the bow already at the time of the second timer interrupt. Accordingly, no reversal signal is generated even if the direction of movement of the manipulator is reversed. In short, the turning of the direction of movement is neglected.

The timer interrupt routine for performing the aforementioned processing will be explained with reference to FIG. 11.

When the timer interrupt routine is started, a judgment in the step S31 is made as to whether all data stored in the key buffer are "0" or not. If all data are not "0", the flow goes to the next step S32. In the step S32, discrimination is made whether the pressure PB of the knob in the pressure-sensitive slide-type performance manipulator is larger than predetermined fine pressure P1 or not. When the pressure data PB is larger than the pressure P1, it means that the pressure-sensitive slide-type performance maniplulator is actually operated. Accordingly, the flow goes to the next step S33. The difference X−Xp obtained by subtracting the previous position Xp from the present position X is stored in the velocity buffer Vb. Further, the present position X is stored in the previous position register Xp, and the previous data is updated.

Then, in the step S34, a judgment is made as to whether the phenomenon has been already detected or not. If the flag OLD is not "0", it means that the phenomenon has been already detected. Accordingly, the flow goes to the next step S35 and a judgment is made as to whether the contents Vb of the velocity register are negative or not. If Vb is negative, "0" is stored in the direction register DIR in the step S37. If Vb is not negative, "1" is stored in the direction register DIR in the step S36. Then, the absolute value ABS(Vb) of the velocity data Vb is stored in the velocity register Vb (the step S38). Here, the velocity is separated into the sign and the absolute value thereof.

Then, in the step S39, a judgment is made as to whether the previous pedal switch flag PPEDSW is "0" and the present pedal switch flag PEDSW is "1" (that is, whether it is an on-event of the pedal switch or not). If the result of the judgment is "No", the flow skips over the step 40 and goes to the step S41. If the result of the judgment is "Yes", it means that the pedal switch is operated newly. Accordingly, the contents of the direction register DIR are stored in the direction latch DIRL (the step S40) and then the flow goes to the step S41.

In the next step S41, the contents of the present pedal switch flag PEDSW are stored in the previous pedal switch flag register PPEDSW to update the data.

Then, in the step S42, a judgment is made as to whether the pedal switch flag PEDSW is "1" or not. Namely, a judgment is made as to whether the pedal switch is currently operated or not. If the pedal switch is not operated, the flow goes to the step S51 directly. If the pedal switch is operated, the contents of the latch DIRL are stored in the direction register DIR in the step S43 to treat the previously stored direction data as the live direction data regardless of the present direction.

In the next step S51, the contents of the direction register DIR, the contents of the velocity register Vb and the contents of the pressure data TABL(P) which have been processed as described above are stored in the direction buffer DIRB, the velocity buffer VB and the pressure buffer PB of the tone signal generating circuit, so that tone signal generating parameters used in the tone signal generating means are determined.

If the results of the judgments in the steps S31 and S32 show the fact that all data are not "0" or the pressure data is smaller than the predetermined fine pressure, registers such as VB, PPEDSW, PB, OLD, DIRB, DIRL, Xp, etc. are cleared in the step S52 and then the flow returns.

If the result of the judgment in the step S34 shows the fact that the flag OLD is "0", the flow goes to the step S53 and "1" is set in the flag OLD.

A modification of the timer interrupt routine of FIG. 11 will be explained hereinbelow with reference to FIG. 12.

Figure 11:
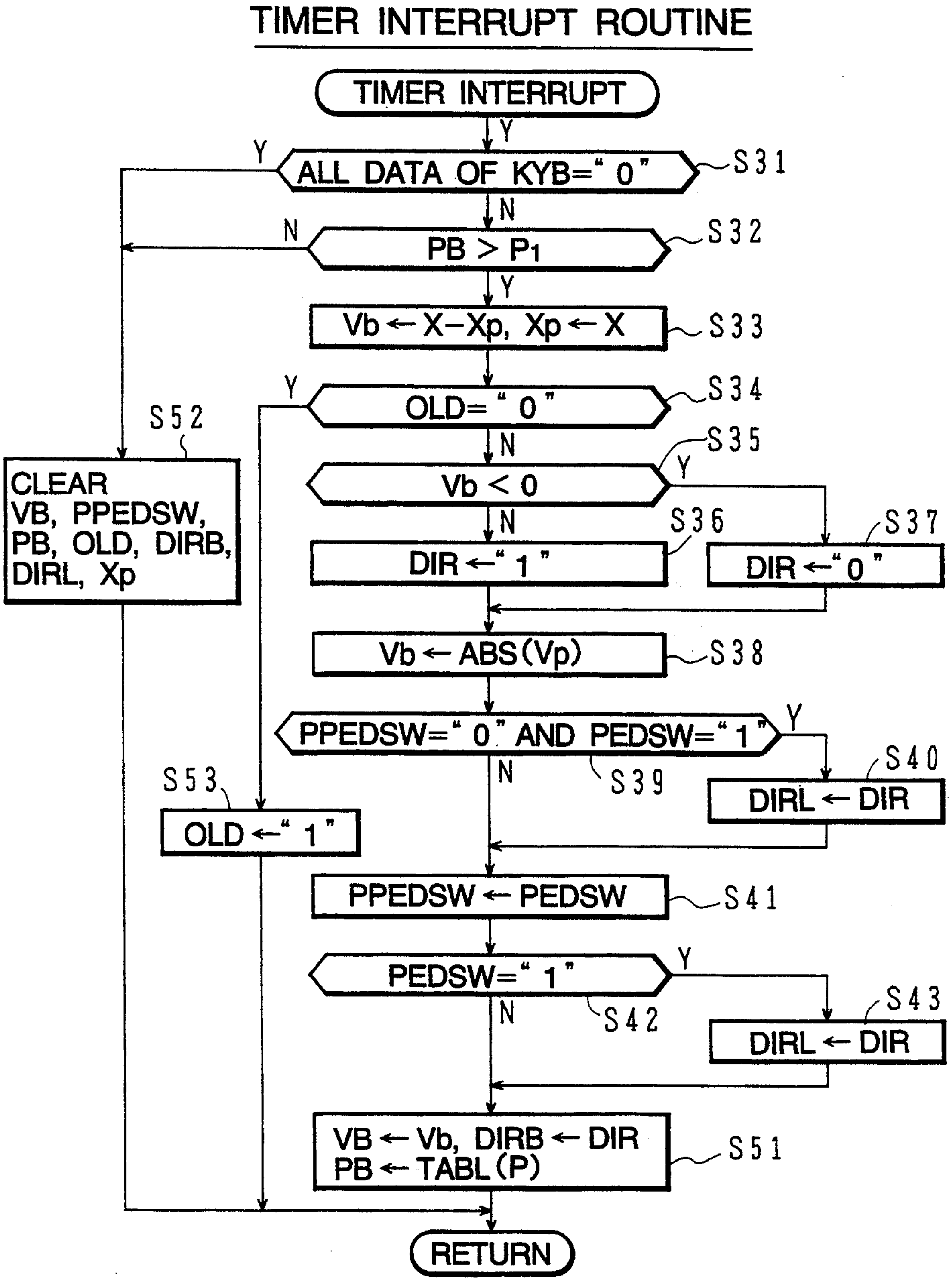
FIG. 11 is a flow chart of the timer interrupt routine according to an embodiment of the invention.

The following steps are added to the timer interrupt routine of FIG. 11 before the step S51.

When the newly added routine is started after the step S42 or S43, a judgment is made in the step S45 as to whether the contents Vb of the velocity register are smaller than the predetermined fine velocity Vmin or not. If the detected velocity Vb is smaller than the predetermined velocity Vmin, the predetermined velocity Vmin is stored in the register Vb. If it is not smaller than the predetermined velocity Vmin, the flow skips over the step S and then returns.

In this way, the velocity data can be prevented from decreasing to a value smaller than the predetermined fine value Vmin, so that the velocity data can be treated as if it was always larger than the predetermined value.

Namely, in the ease where the bow is turned, the bow velocity once becomes "0" as described above with reference to FIG. 6. By the aforementioned processing, the predetermined value instead of the actual value is sent out as the velocity when the bow velocity is smaller than the predetermined value. Accordingly, the bow velocity can be prevented from decreasing to a value smaller than the predetermined value.

Figure 13:
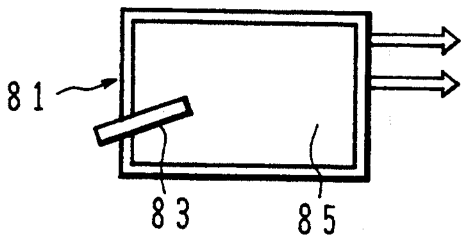
FIG. 13 is a schematic plan view showing another example of the pressure-sensitive performance manipulator.

FIG. 13 shows another example of the pressure-sensitive performance manipulator. Although the pressure-sensitive performance manipulator in FIG. 5 has a knob moving on a line, the pressure-sensitive manipulator 81 in FIG. 13 has a manipulation region formed of a two-dimensional plane. That is, in FIG. 13, when the pen-shaped hand performance manipulator 83 is manipulated on a manipulation region 85, the position and pressure of manipulation are sent out. Namely, three-dimensional outputs constituted by coordinates on the two-dimensional plane and pressure can be obtained.

The timer interrupt routine according to a further embodiment of the invention using such a plane manipulator will be explained hereinbelow with reference to FIG. 14. When the routine is started, a judgment is made in the step S61 as to whether the absolute value ABS(Vb) of the velocity is positive (non-zero) or not. If it is positive, the flow goes to the next step S62 and a judgment is made as to whether all data in the key buffer KYB are "0" or not. If all data are not "0", the flow goes to the next step S63 and a judgment is made as to whether the detected pressure PB of the pressure-sensitive slide-type performance manipulator is larger than the predetermined fine pressure P1 or not. If the detected pressure PB is larger than the predetermined fine pressure P1, the flow goes to the next step S63 and the distance of movement in the plane is calculated and stored in the velocity register Vb. Further, the angle $\theta$ is calculated from the direction of movement. The X directional position X and the Y directional position Y are respectively stored in the previous X position register Xp and the previous Y position register Yp to update data.

Then, in the step S65, a judgment is made from the flag OLD as to whether the event has already occurred or not. If the flag OLD is "0", it means that the phenomenon is detected first. Accordingly, "1" is set in the flag OLD in the step S72. If the flag OLD is not "0", the angle change is stored in the register dir in the step S66. Further, the present angle $\theta$ is stored in the previous register $\theta$ p to update angle data.

Then, in the step S67, a judgment is made as to whether the contents of the angle change register dir are positive or not. If dir is positive, "1" is stored in the direction register DIR in the next step S68. If dir is not positive, "0" is stored in the register DIR in the step S69. In short, discrimination of "direction" is perfected here.

Then, in the step S39, a judgment is made as to whether the previous pedal switch flag PPEDSW is "0" and the present pedal switch flag PEDSW is "1". Namely, a judgment is made as to whether the pedal switch is pushed or not. If the pedal switch is operated newly, the content of the register DIR is stored in the direction latch DIRL in the step S40 according to the arrow Y and then the flow goes to the step S41. If the pedal switch is not operated newly, the flow goes to the step S41 according to the arrow N. In the step S41, the content of the previous pedal switch flag is updated. Then, in the step S42, a judgment is made as to whether the contents of the pedal switch flag PEDSW are "1" or not. If it is "1", it means that the latched direction is to be used in place of the actual direction. Accordingly, the flow goes to the step S43 according to the arrow Y and the contents of the latch DIRL are newly stored in the direction register DIR. If it is not "1", the flow skips over this step and goes to the next step.

Then, the processing in the step S51 is made. In this step, the contents of the velocity register Vb, the contents of the direction register DIR and the contents of the pressure register TABL(P) are respectively stored in the velocity buffer VB, the direction buffer DIRB and the pressure buffer PB of the tone signal generating circuit.

If the results of the judgments in the steps S61, S62 and S63 are "N", "Y" and "N", respectively, the flow goes to the step S71 and various registers such as VB, PPEDSW, PB, OLD, DIRB, DIRL, Xp, etc. are cleared. Then, the flow returns.

Figure 12:
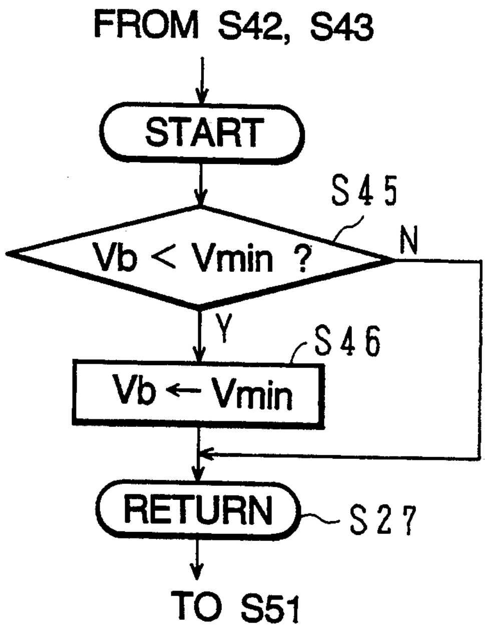
FIG. 12 is a flow chart of part of the timer interrupt routine according to another embodiment of the invention.
Figure 14:
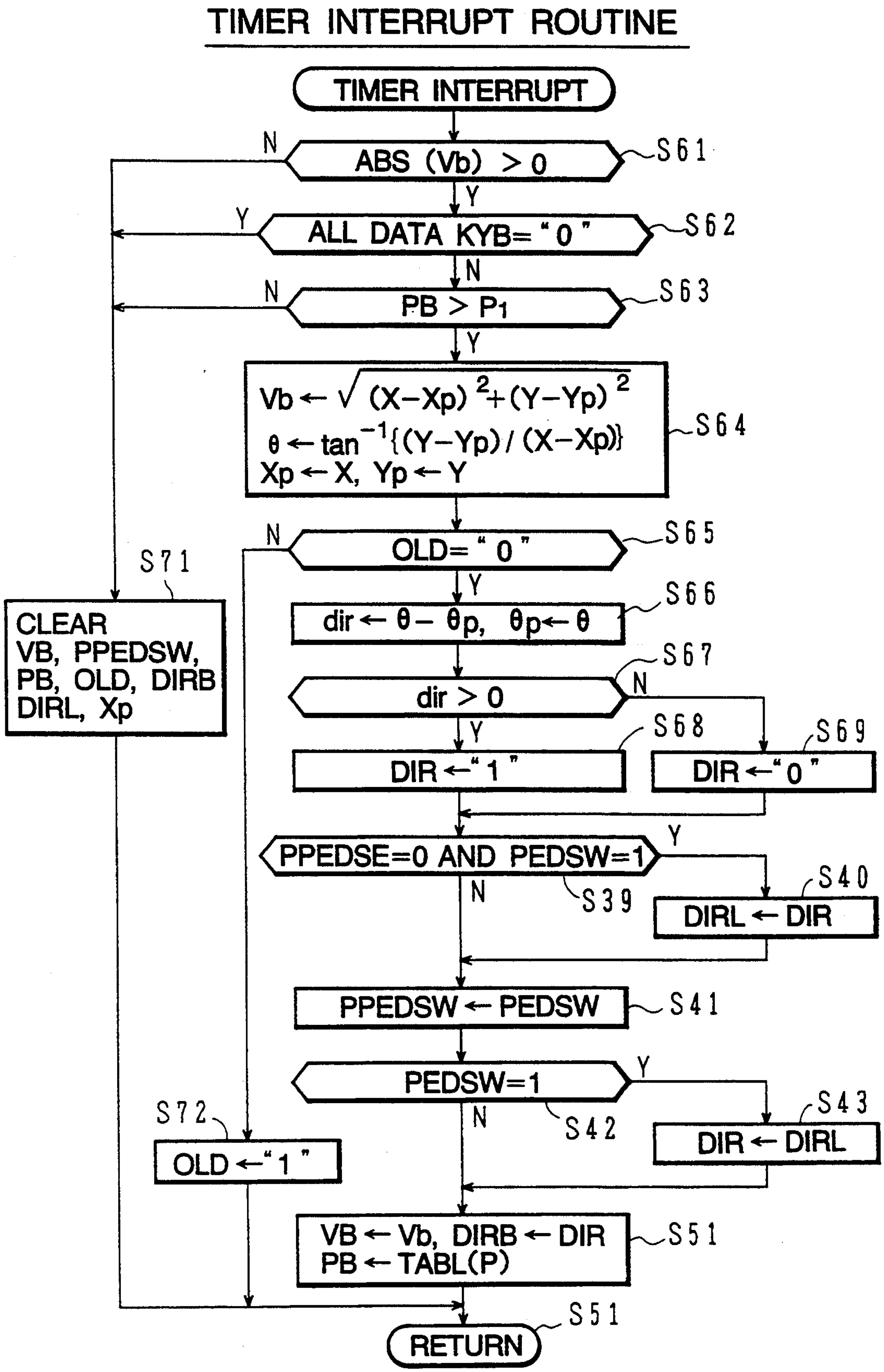
FIG. 14 is a flow chart of the timer interrupt routine according to a further embodiment of the invention.

Here, the steps in FIG. 12 may be provided between the step S42 or S43 and the next step S51 in FIG. 14. Even if the velocity becomes zero at the time of the turning of the sign of the angle change, tone generation can be kept.

Although the aforementioned embodiment has shown the case where continuous tone control is made by using the foot pedal switch, the foot pedal switch 5 may be replaced by another suitable switch. For example, various switches such as knee switch, head switch, press switch, neck switch, switch at an arbitrary place of the knob 11 of the manipulator 1, etc. may be used. The turning of the bow can be neglected selectively by using these switches. In the ease of a two-dimensional manipulator, the description has been made on the case where the direction data is generated on the basis of the angle of the direction of movement. However, it is a matter of course that the direction data may be generated by another method. For example, the direction data may be generated by a method in which a reference point and a reference axis are established so that an angle with respect to the reference axis can be automatically determined when a position with respect to the reference point is determined, and the direction data is generated on the basis of the change of the angle. Although the description has been made on the case where the direction of movement of the bow is kept by the foot switch, it is a matter of course that other information such as velocity information, pressure information, etc. may be kept.

In the aforementioned configuration, permanent tone generation low in uncomfortable feelings can be made without occurrence of the large change of the performance style. Further, it is to be understood that the electronic musical instrument according to the invention is not limited to synthesis of the tone of rubbed string instruments and that the invention can be applied to synthesis of the tone of wind instruments. In the case where the invention is applied to a wind instrument, the information pertaining to the direction of movement of the manipulator may be kept and the information pertaining to the velocity may be kept if necessary.

As is described above, according to the embodiments of this invention, information pertaining to the manipulation of the performance manipulator against player's will can be neglected by the player's will.

Accordingly, a continuous tone can be generated permanently.

Although description has been made on the embodiments of the present invention, the present invention is not limited thereto. For example, it will be apparent for those skilled in the art that various changes, modifications, improvements and combinations thereof may be made.

What is claimed is:

1. An electronic musical instrument comprising:

manipulation means for defining a manipulation region of at least one dimension and for achieving performance manipulation within said manipulation region;

position detection means for detecting the position of performance manipulation within said manipulation region;

arithmetic operation means for calculating information pertaining to the direction and velocity of movement from the time change of the position of performance manipulation;

tone signal generating means for generating a tone signal using said information pertaining to the direction and velocity information as a parameter of controlling the tone signal; and selectively operable latch means for latching, at the time of operation thereof, information pertaining to at least one of the direction and velocity of the movement;

wherein said tone signal generating means generates a tone signal using said information latched by said latch means during operation of said latch means regardless of changes in direction or velocity of performance manipulation.

2. An electronic musical instrument according to claim 1, further comprising switch means capable of commanding said latch means to latch the information.

3. An electronic musical instrument according to claim 2, further comprising means for making the information pertaining to the velocity of movement be not smaller than a predetermined value when said switch means is operated and the changing of the direction of movement is not transmitted to said tone signal generating means.

4. An electronic musical instrument according to claim 1, wherein said manipulation means defines a linear manipulation region.

5. An electronic musical instrument according to claim 1, wherein said manipulation means defines a plane manipulation region.

6. An electronic musical instrument according to claim 5, in which the information pertaining to the direction of movement is derived from the angle of movement in the plane.

7. An electronic musical instrument comprising:

means for generating a tone signal based on control parameters, the parameters including speed and direction;

manipulation means for achieving performance manipulation;

detection means for detecting said performance manipulation and supplying parameters representing the speed and the direction of said performance manipulation;

means for latching the parameter representing the direction; and actuator means to be actuated by a player for causing latching of the parameter and supplying the latched parameter to said tone signal generating means for the duration of actuation.

8. An electronic musical instrument according to claim 7, wherein said tone signal generating means comprises a physical simulation type tone signal generator which comprises:

non-linear conversion means for converting a signal inputted thereto nonlinearly and supplying an output signal;

delay means for delaying the output signal of said non-linear conversion means;

means for interconnecting said non-linear conversion means and said delay means in a loop; and excitation means for generating and supplying an excitation signal to said loop.

9. An electronic musical instrument according to claim 8, wherein said non-linear circuits have an input for receiving said speed parameter.

10. An electronic musical instrument according to claim 9, further comprising:

means for setting a minimum velocity; and means for comparing the velocity parameter with the minimum velocity;

means for supplying the minimum velocity to the non-linear circuits when the velocity parameter is smaller than the minimum velocity and said actuator means is actuated.

11. A tone signal controlling system for an electronic musical instrument comprising:

manipulator means, capable of being manipulated by an operator substantially continuously, for generating a manipulation information signal which changes substantially continuously corresponding to manipulation;

control means for generating a control signal for controlling a tone signal to be generated in the electronic musical instrument based on said manipulation information signal; and selectively operable latch means for latching said manipulation information signal in response to operation said latch means.

12. A tone signal controlling system according to claim 11, further comprising switch means capable of commanding said latch means to latch the information.

13. A tone signal controlling system according to claim 11, wherein said electronic musical instrument comprises a physical simulation type tone signal generator which comprises:

non-linear conversion means for converting a signal inputted thereto nonlinearly and supplying an output signal;

delay means for delaying the output signal of said non-linear conversion means;

means for interconnecting said non-linear conversion means and said delay means in a loop; and excitation means for generating and supplying an excitation signal to said loop.

14. A tone signal controlling system according to claim 11, wherein said manipulator means includes a linearly movable member which is to be manipulated by a player.

15. A tone signal controlling system, comprising:

first manipulator means including a member which is reversibly movable in one dimension and generates a direction information signal representing the direction of movement;

control means for generating a tone signal controlling signal based on said direction information signal;

second manipulation means including an actuator to be operated by a player; and means for controlling said control means to neglect change of said direction information signal when said actuator of the second manipulation means is operated.

16. An electronic musical instrument comprising:

manipulation means for defining a manipulation region of at least one dimension and for achieving performance manipulation within said manipulation region;

position detection means for detecting the position of performance manipulation within said manipulation region;

arithmetic operation means for calculating the information pertaining to direction and velocity of performance manipulation from the detected position;

selectively operable latch means for latching information pertaining to at least one of direction and velocity of performance manipulation;

tone signal generating means for generating a tone signal using said latched information pertaining to each latched parameter while the latch means is operated and for generating a tone signal using said information from said arithmetic operation means for all parameters while said latch means is not operated.

* * * * *